(12) United States Patent
Cookson

(10) Patent No.: US 6,491,209 B1
(45) Date of Patent: Dec. 10, 2002

(54) CONTINUOUS BAND MANUFACTURE

(75) Inventor: Anthony Cookson, Lancashire (GB)

(73) Assignee: Harrison Saw and Tool Limited, Lancashire (GB)

( * ) Notice: Subject to any disclaimer, the term of this patent is extended or adjusted under 35 U.S.C. 154(b) by 0 days.

(21) Appl. No.: 09/367,431

(22) PCT Filed: Dec. 10, 1998

(86) PCT No.: PCT/GB98/03648

§ 371 (c)(1),
(2), (4) Date: Aug. 13, 1999

(87) PCT Pub. No.: WO99/30867

PCT Pub. Date: Jun. 24, 1999

(30) Foreign Application Priority Data

Dec. 13, 1997 (GB) .............................. 9726301

(51) Int. Cl.⁷ ..................... B23K 37/00; B21D 21/00; B21D 35/00
(52) U.S. Cl. .................. 228/141.1; 228/144; 228/44.3; 219/101; 29/281.4; 29/281.5
(58) Field of Search .............................. 228/141.1, 144, 228/44.3; 269/43; 219/101; 156/73.1; 29/281.4, 281.5

(56) References Cited

U.S. PATENT DOCUMENTS

| 3,566,779 A | * | 3/1971 | Kronsbein | ..................... 100/4 |
| 3,696,654 A | * | 10/1972 | Bohn | ........................ 72/299 |
| 3,700,157 A | * | 10/1972 | Shumaker | ..................... 228/5 |
| 3,915,368 A | * | 10/1975 | Ulmer | ........................ 228/13 |
| 4,063,061 A | * | 12/1977 | Fujino et al. | ................ 219/101 |
| 4,192,055 A | * | 3/1980 | Moore | ........................ 228/49.1 |
| 4,675,495 A | * | 6/1987 | Kielbania et al. | ............. 219/97 |
| 4,683,017 A | * | 7/1987 | Figiel et al. | ................ 156/73.1 |
| 4,879,448 A | * | 11/1989 | Folger et al. | .......... 219/121.63 |
| 5,033,723 A | * | 7/1991 | Katona | ....................... 269/87.2 |
| 5,203,948 A | * | 4/1993 | Suska | .......................... 144/267 |
| 5,304,266 A | * | 4/1994 | Becking | ....................... 156/64 |
| 5,351,877 A | * | 10/1994 | Rottger | ....................... 228/212 |
| 5,775,179 A | * | 7/1998 | Haas | .............................. 76/61 |
| 5,931,369 A | * | 8/1999 | Hellbergh | ..................... 228/103 |
| 6,035,774 A | * | 3/2000 | Fischer | ......................... 100/32 |
| 6,289,767 B1 | * | 9/2001 | Cookson | ...................... 76/112 |

FOREIGN PATENT DOCUMENTS

EP 0195305 A * 9/1986 ..................... 228/5

* cited by examiner

Primary Examiner—M. Alexandra Elve
Assistant Examiner—L. Edmondson
(74) Attorney, Agent, or Firm—Michael Best & Friedrich LLP

(57) ABSTRACT

A band saw strip manipulator is arranged to receive a toothed metal strip for welding from a cut to length machine. The strip is moved into the band saw strip manipulator by powered rollers. The strip extends between a first edge detector at one side of the manipulator and a second edge detector at the opposite side of the manipulator. First and second end clamps are located to either side of a carriage mounted for vertical movement. When the strip has been approximately centrally located in the manipulator the carriage moves upwardly thereby pulling the strip upwardly until the edge detectors detect the ends of the strip. The first and second end clamps are then closed and pivoted about first and second guide rollers so that the two ends of the strip are located in close proximity for welding together.

28 Claims, 3 Drawing Sheets

CONTINUOUS BAND MANUFACTURE

BACKGROUND OF THE INVENTION

This invention relates to a manipulator for presenting a strip for welding to a welding machine and to a method of presenting a strip for welding to a welding machine.

A previous apparatus for presenting a strip for welding into a band saw to a welding machine has used a pre-programmed robot to effect the manipulation. Disadvantages arise with this arrangement because of the high initial costs of purchasing a robot system and the difficulty encountered by robots when handling blades of a very long length.

Another known manipulation technique is by means of manual labour to clamp the adjacent ends of the strip in a welding machine. This has obvious disadvantages in that a number of clamping operations may be required to achieve an accurate positioning of the two ends and also the high costs involved with manual labour.

SUMMARY OF THE INVENTION

It is an object of the present invention to address the above mentioned disadvantages.

According to a first aspect of the present invention a manipulator for presenting a strip for welding to a welding machine comprising strip adjustment means and end clamp means for clamping end sections of the strip, which adjustment means are operable to adjust the position of end sections of the strip in the end clamp means, and which end clamp means are operable to clamp end sections of the strip and to manipulate the strip from a substantially elongate configuration to a loop configuration for welding.

The strip may be an unwelded band saw blade.

The strip adjustment means may be mounted for movement transverse to the length of a strip.

The strip adjustment means may be operable to move between a first position in which at least one end section of the strip is spaced from the end clamp means and a second position in which said at least one end section of the strip is substantially adjacent to the end clamp means.

The strip adjustment means may be operable to pull the strip through the end clamp means, said pulling may be effected until at least one end detector detects an end of the strip. The manipulator may include one end detector for each end of the strip. The strip adjustment means may include a clamp, which may be arranged to hold the strip in position during said pulling.

The strip adjustment means may be mounted for substantially vertical movement. The strip adjustment means may, in use, cause a loop of the strip to be pulled upwardly when moving to said second position. Said loop may be supported by rollers of the strip adjustment means, which rollers may have relative locations which provide a smooth curve over which the loop may rest. The rollers may permit movement of the loop relative thereto.

The end clamp means may comprise two or more clamp sections. Where two clamp sections are provided one may be located to one side of the strip adjustment means and the second to the opposite side of the strip adjustment means. Each clamp section may comprise two clamps.

The end clamp means may be operable to move between a strip receiving configuration and a loop delivery configuration.

The strip receiving configuration may comprise at least one opening of the end clamp means being aligned along a longitudinal axis of the strip, when the strip is in the elongate configuration.

The loop delivery configuration may comprise at least one opening of the end clamp means being aligned along a longitudinal axis of the end sections of the strip when the strip is in the loop configuration. The longitudinal axis of the end sections when in the loop configuration is preferably at a different, preferably higher, level than the longitudinal axis of the strip when in the elongate configuration.

The end clamp means may be mounted to pivot between said strip receiving and said loop delivery configurations.

The end clamp means may comprise at least one clamp mounted on an arm, one end of the arm may be pivotally mounted. The arm may comprise two sections formed at an angle to each other. Said angle may permit said at least one clamp to move between different levels when the arm is pivoted, which pivoting may be through substantially 180°. The different levels may be those of the strip end sections when in the strip receiving configuration and in the loop delivery configuration.

The end clamp means may be operable to adjust the relative positions of the strip ends, said adjustment may be in addition to the adjustment by the strip adjustment means.

The end clamp means may be operable to clamp the strip with variable degrees of force.

The manipulator may be movable between a strip receiving position and a transfer position for transferring a strip for welding to a welder.

According to a second aspect of the present invention, a method of manipulating a strip for presentation to a welding machine comprising receiving a strip in a manipulator in a substantially elongate configuration in end clamp means, adjusting the position of at least one end section of the strip in the end clamp means with strip adjustment means and manipulating the strip from said substantially elongate configuration to a loop configuration for welding with said end clamp means.

The strip may be clamped by a first clamp of the end clamp means when it reaches a chosen position relative to the first clamp, said position may be dictated by an end stop.

The adjustment of the said at least one end section may be an adjustment in a second clamp of the clamp means, which adjustment may be effected while said first clamp is activated.

The strip may be cut from a greater length of material after initial adjustment of the strip.

The strip adjustment means may adjust the position of the strip by pulling a section of the strip through the end clamp means. The adjustment may be transverse to the longitudinal axis of the strip.

The adjustment may be made until an end detector detects that at least one end section of the strip is close to the end clamp means.

Preferably the method includes the end clamp means comprising clamps located at opposite sides of the strip adjustment means. Preferably, there is at least one clamp for each end section of the strip.

The manipulation of the strip preferably comprises pivoting the clamps between a first position in which the end sections of the strip point substantially away from each other to a second position in which the end sections point towards each other and are in close proximity to each other.

The pivoting between first and second positions preferably comprises a turn through substantially a half circle.

The manipulation step is preferably followed by the strip being presented to a welder, preferably by movement of the manipulator towards the welder.

According to a third aspect of the present invention a welding station for receiving a loop for welding from a manipulator according to the first aspect comprising at least one welding machine mounted on a turntable and a loop support section.

The loop support section may be arranged to support a loop during a welding operation.

The turntable may be arranged to move between a first, loop receiving position and a second, loop discharge position. The welding machine may be arranged to weld said loop whilst moving between said first and second positions.

A discharge section may be arranged to remove a welded loop from the loop support section by means of relative movement between the discharge section and the loop support section. Preferably, supports of the discharge section are operable to lift a loop from the loop support section.

The welding section may comprise at least two welding machines, which may be located at opposite sides of the turntable.

Where at least two welding machines are provided, the welding station may be arranged to receive a manipulated loop in a first of the welding machines while a second of the welding machine has another loop removed therefrom by the discharge section.

According to a fourth aspect of the present invention a method of welding a loop for welding received from a manipulator according to the first aspect comprises supporting the loop on a loop support section and welding the loop with a welding machine while the welding machine is moved on a turntable between a loop receiving position and a loop discharge position.

According to a fifth aspect of the present invention a loop manipulation and welding machine comprises a loop manipulator according to any aspect of the first aspect of the present invention and a welding station according to any aspect of the third aspect.

According to a sixth aspect of the present invention, a method of manipulating a strip for welding and welding said strip comprises the methods of any aspects of the second and fourth aspects of the present invention combined.

Any of the above aspects can be combined with any of the features disclosed herein, in any combination.

Specific embodiments of the present invention will now be described, by way of example, with reference to the accompanying drawings, in which:

DETAILED DESCRIPTION OF THE INVENTION

Figure 1:
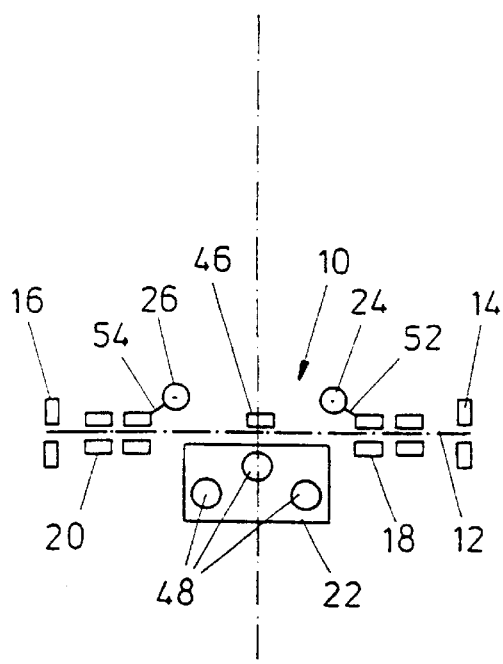
FIG. 1 is a diagrammatic side view of a band saw strip manipulator in a strip receiving configuration.
Figure 2:
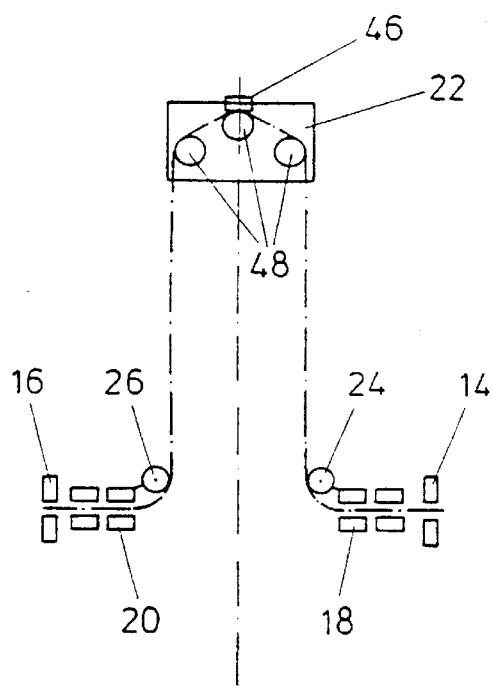
FIG. 2 is a diagrammatic front view of the band saw strip manipulator of FIG. 1 in a strip manipulation configuration.
Figure 3:
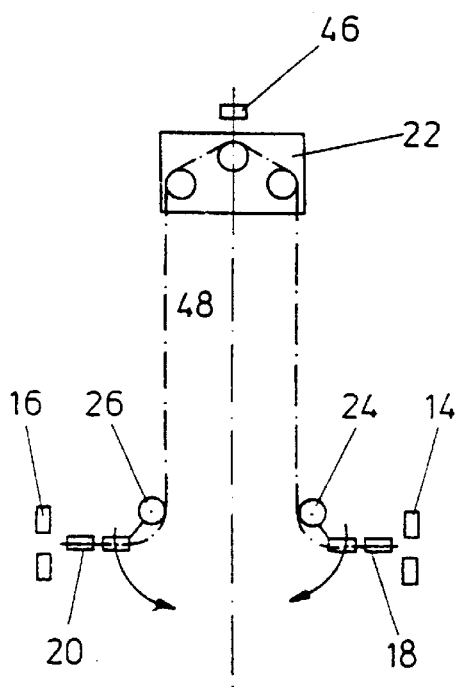
FIG. 3 is a diagrammatic front view of the band saw strip manipulator similar to that of FIG. 2, but with end clamps engaged on a strip and an upper clamp open.
Figure 4:
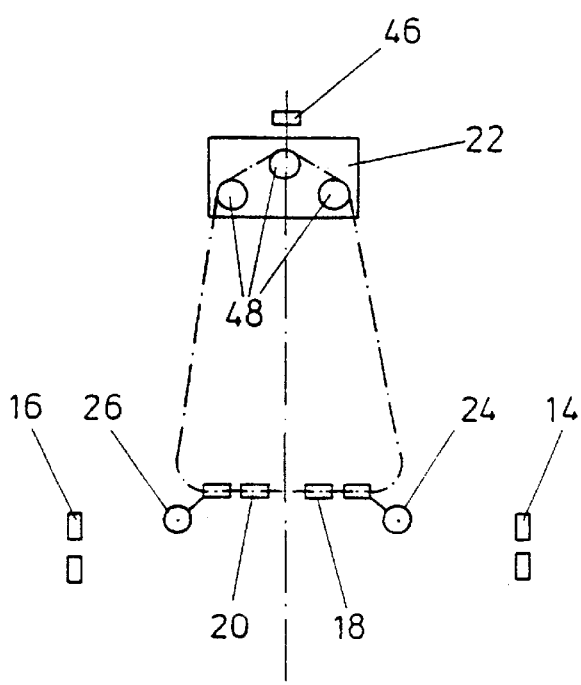
FIG. 4 is a diagrammatic front view of the band saw strip manipulator at the end of a manipulation stage.
Figure 6:
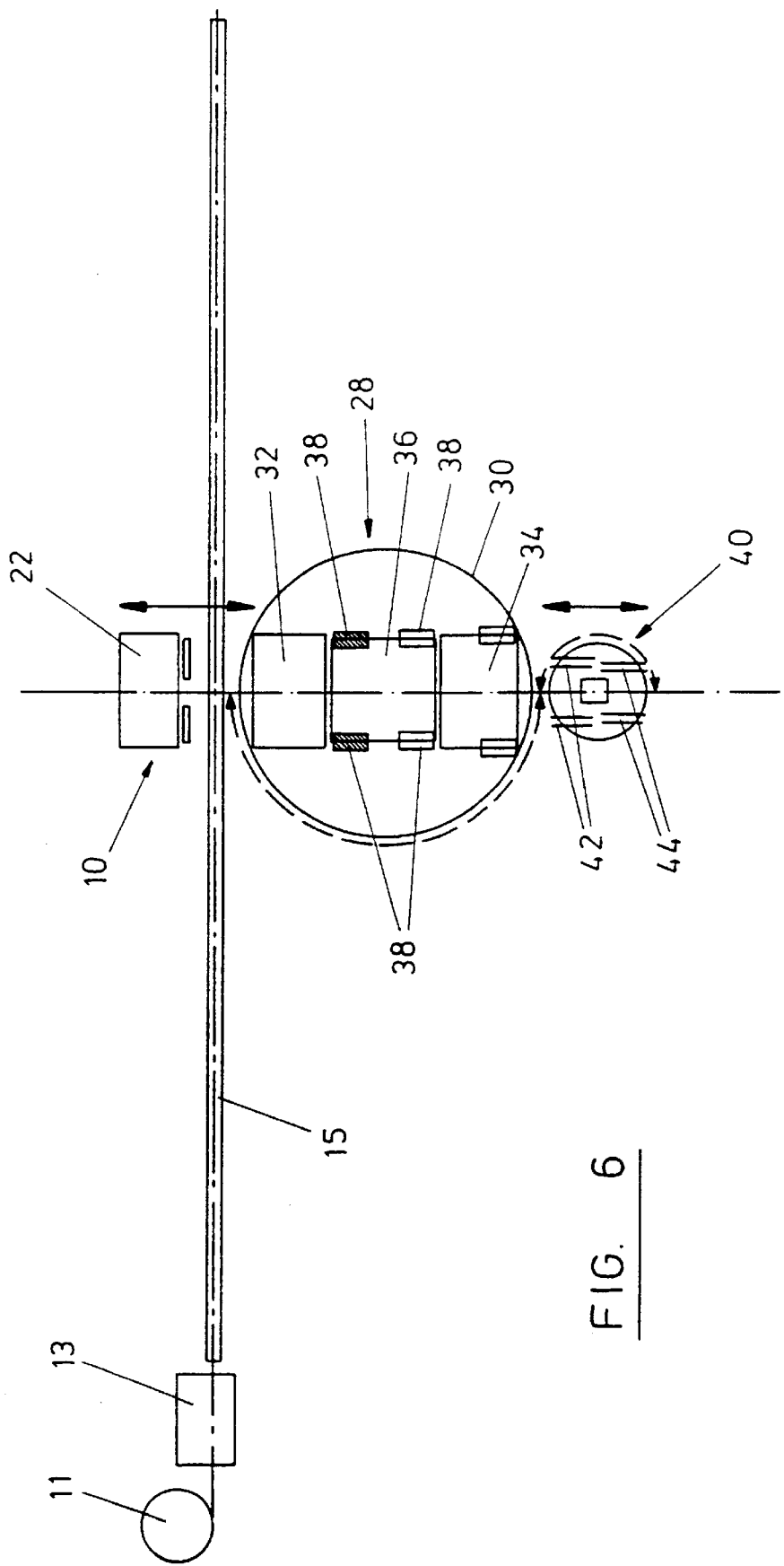
FIG. 6 is a diagrammatic plan view of a band saw welding station, including the band saw strip manipulator shown in FIGS. 1 to 4.

A band saw strip manipulator 10 is arranged to receive a toothed metal strip 12 for welding from a cut to length machine 13 (see FIG. 6). The strip may suitably be any metal strip, with or without teeth. The cut to length machine 13 is arranged to take a section of strip from a coil 11 and to cut the strip when a desired length thereof has been removed from the coil. The strip 12 is moved into the band saw strip manipulator 10 by powered rollers (not shown). The strip 12 extends between a first edge detector 14 at one side of the manipulator 10 and a second edge detector 16 at the opposite side of the manipulator 10. First and second end clamps 18 and 20 are located to either side of a carriage 22 mounted for vertical movement. When the strip 12 has been approximately centrally located in the manipulator 10 the carriage 22 moves upwardly from the position shown in FIG. 1 to the position shown in FIG. 2, thereby pulling the strip upwardly until the edge detectors 14 and 16 detect the ends of the strip 12. The first and second end clamps 18 and 20 are then closed and pivoted about first and second guide rollers 24 and 26 so that the two ends of the strip 12 are located in close proximity (as shown in FIG. 4) for welding together.

The band saw manipulator will now be described in greater detail.

The strip 12 has teeth along one edge so that when it is welded into a loop it can be used as a band saw blade. When the strip 12 is received from the cut-to-length machine 13 it is supported partly on the powered rollers, which may be nylon, and partly on a dump table 15 (see FIG. 6). The dump table 15 has a rear face which abuts the strip 12 and provides a point a point of reference for the lateral position of the strip 12.

The edge detectors 14 and 16 comprise photo transmitters and detectors located above and below the strip 12 respectively to detect the passage of an edge of the strip 12 therebetween.

Alternatively the edge detectors may be mechanical detectors, inductive proximity detectors, retro reflective detectors or through-beam photocell detectors.

The first edge detector 14 provides control signals for the first end clamp 18 and the second edge detector provides control signals for the second end clamp 20. When one of the edge detectors is activated and it detects an edge its corresponding clamp is closed on a light pressure.

The end clamps 18 and 20 are powered by pneumatic cylinders and are supported on respective support arms 52 and 54 (see FIG. 5), which are attached to the guide rollers 24 and 26 respectively. The support arms 52 and 54 are mirror images of each other and each comprises two sections arranged at an angle to each other.

The carriage 22 comprises a clamp 46, which is also pneumatic. The carriage 22 comprises three rollers 48 arranged in a triangular layout to provide a smooth curve about which the strip 12 can bend when supported by the carriage 22. The carriage 22 receives control signals from the edge detectors 14 and 16.

The guide rollers 24 and 26 are arranged to pivot with their respective end clamps 18 and 20 to which they are attached by the support arms 52 and 54. The pivoting is indexed. The pivot point 50 (see FIG. 5) is the centre of the guide rollers 24 and 26. In their initial configuration the end clamps 18 and 20 are lower than their guide rollers 24 and 26 because of the angle in the support arms 52 and 54. After pivoting the end clamps 18 and 20 are located above the level of their respective guide rollers 24 and 26, again because of the angle in the support arms 52 and 54.

The band saw strip manipulator 10 is associated with a welding section 28, as shown in FIG. 6. The welding section 28 comprises a turn table 30 on opposite sides of which are located first and second welders 32 and 34. In between the first and second welders 32 and 34 there is a strip support tower 36, spaced fork members 38 of which are mounted for vertical movement. The spaced fork members 38 are for supporting the strips. The turntable 30 is mounted for indexed rotation between a first position in which the first welder 32 is adjacent to the manipulator 10 whilst the second welder 34 is adjacent to a discharge storage rack 40 on the opposite side of the turntable 30, and a second position in which the turntable 30 has been rotated through 180° so that the first welder 32 is adjacent to the discharge storage rack 40 and the second welder is adjacent to the manipulator 10. The rotation is indexed.

The discharge storage rack 40 comprises first and second pairs of fork members 42 and 44, which face in opposite directions. The discharge storage rack 40 is mounted for movement towards and away from the turntable 30 and also mounted for rotation to allow either the first or second pair of fork members 42 or 44 to be presented to the turntable 30.

In use, a strip of metal 10 is drawn from a coil 11 and cut by the cut to length machine 13. The powered nylon rollers move the strip 12 until it is roughly centrally located within the manipulator 10 using information supplied from the cut to length machine 13. The clamp 46 of the carriage 22 is engaged on the strip 12 and the carriage is then moved upwardly until the first and second edge detectors 14 and 16 detect the passage of opposite ends of the strip 12. When the first edge detector 14 detects the right hand end of the strip the first end clamp 18 is engaged on the strip. Likewise, when the left hand end of the strip 12 is detected by the second edge detector 16 the second end clamp 20 engages the strip. Both of the clamps are closed on a light pressure. After the first and second end clamps 18 and 20 have been engaged with light pressure on the ends of the strip 12, the clamp 46 on the carriage 22 is opened. Final adjustments of the positions of the two ends of the strip 12 are then made by inward movement of the end clamps 18 and 20. Also, lateral adjustment of the ends of the strip 12 is made so that the sides of each end of the strip are aligned with each other. The lateral adjustment is made by pushing the sides of the strip 12 up to the vertical face of the dump table 15, or by any other suitable method.

Alternatively, before the carriage 22 is moved upwards, one end clamp 18 or 20 may engage the strip when its corresponding edge detector 14 or 16 detects the end of the strip. The carriage 22 may then be moved upwards until the other end passes its edge detector 14, 16, when it is clamped. Thus, all of the material is supplied from one side of the manipulator 10, giving a more compact device because the blade material is only accomodated on one side of the device.

When the final adjustment has been made the end clamps 18 and 20 exert a firm pressure on the ends of the strip to hold it in position.

Figure 5:
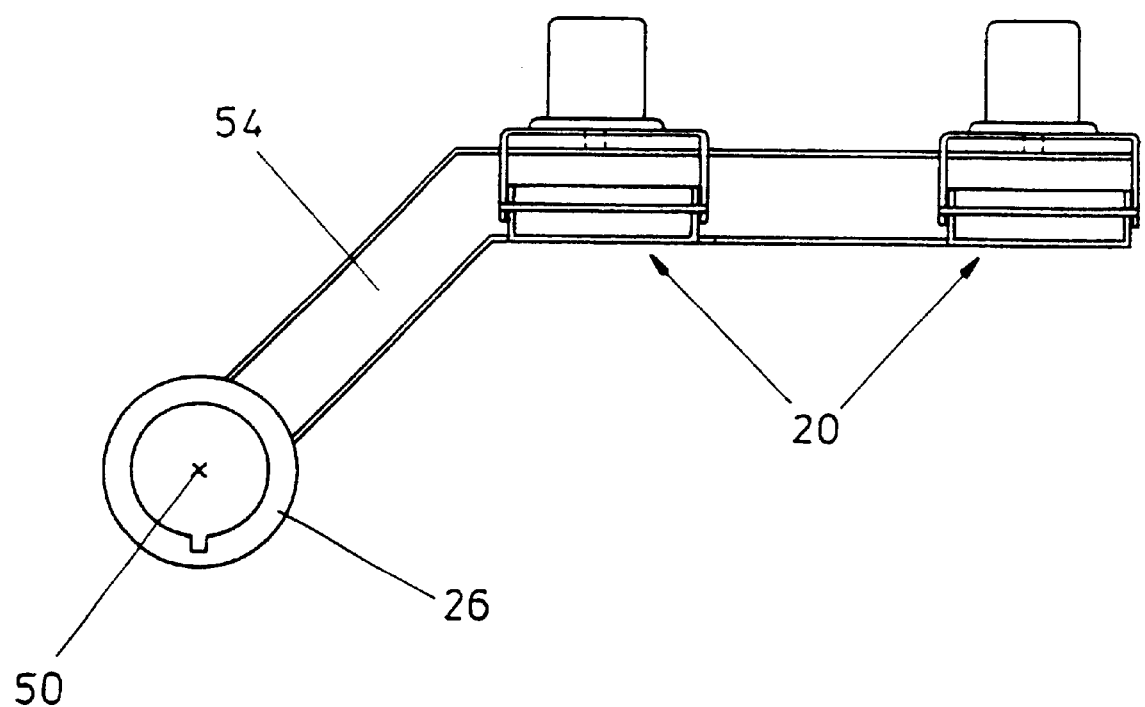
FIG. 5 is a diagrammatic front view of a clamping arm of the band saw strip manipulator.

The respective support arms 52 and 54 for the first and second end clamps 18 and 20 are then rotated about their corresponding guide rollers 24 and 26 to bring the first and second end clamps 18 and 20 into the positions shown in FIG. 4. The rotation of the support arms thus brings the two ends of the strip 12 into close proximity with each other. FIG. 5 shows in greater detail the second end clamp 20 in the position shown in FIG. 4. The angle in the arms 52 and 54 and the pivoting mentioned above allows the ends of the strip to be raised from the level of the dump table 15 so that the ends can be presented to the welding section 23.

The manipulator 10 is then moved towards the welding section 28 for welding. Clamps (not shown) of the first welder 32 engage the strip 12 when a suitably located limit switch is activated. When these clamps have closed, the first and second end clamps 18 and 20 of the manipulator 10 are released. The carriage 22 is lowered until the fork members 38 of the strip support tower 36 support the strip 12. The manipulator 10 is then retracted to its original position so that it can manipulate a further strip which has been received from the cut to length machine 13. When held in position in the first welder 32, the adjacent ends of the strip 12 are welded together using any form of welding technique, such as upset, flashbutt or laser welding, which requires no subsequent grinding of the blade. The welding operation can be undertaken whilst the turntable 30 is rotating between the first and second positions mentioned above. On arriving at the second position the first welder 32 releases its clamps from the strip 12, the discharge storage rack 40 moves forward and upwards to remove the now welded strip 12 from the strip support tower 36. In the meantime, the second welder 34 has arrived at a position adjacent to the manipulator 10 for receiving a further strip 12 which has been manipulated by the manipulator 10 whilst the above mentioned welding operation has been performed.

When a sufficient number of welded strips have been placed on the discharge storage rack 40 it can be rotated to allow an operator to approach and remove the welded strips.

In the above operation cutting teeth of the strip 12 are arranged to point from the manipulator 10 towards the welding section 28, so that the flat side of the strip is presented to the dump table 15 and so it can accommodate a wide variety of widths of strip 12.

An alternative embodiment of manipulator comprises the same parts as those shown in FIGS. 1 to 6 except that the cut to length machine is considerably closer to the manipulator 10 than is shown in FIG. 6. Also, instead of the first edge detector 14 there is a stop which prevents the further movement of the strip along the table 15.

The alternative embodiment is used in a different manner to the embodiment described above, as follows. When a strip is fed to the manipulator 10 it is stopped when it hits the stop, whereupon the first end clamp 18 engages the strip and holds it in position. At this stage the strip has not yet been cut from the coil 11 by the cut to length machine 13. Instead, when the end of the strip has been clamped in the first end clamp 18, the carriage 22 is moved upwardly as described above, which pulls the strip through the second end clamp 20 which has not yet been engaged on the strip. By this method the position of the strip relative to the first end clamp is maintained whilst the strip is pulled through the second end clamp 20. When the desired length of strip has been pulled through the cut to length machine 13 the strip 12 is cut. The carriage 22 then continues its upward movement until the end of the strip is detected by the second edge detector 16, whereupon the second clamp 18 engages the strip 12. The manipulation of the strip 12 then proceeds as described above in relation to the first embodiment.

This embodiment provides a more compact manipulation apparatus because the length of the strip 12 does not need to be accommodated on the dump table 15 because the cut to length machine 13 only cuts the strip when sufficient material has been pulled into the manipulator 10 by the carriage 22. Also, the need for two edge detectors is dispensed with because only the second edge detector 16 is required. Furthermore the cut to length machine 13 moves the strip towards the manipulator 10, thereby removing the need for powered rollers to move the strip into the manipulator 10.

Another feature of the second embodiment is that the carriage comprises a single roller and no clamp is necessary, because the strip is already fixed in the first end clamp 18 at the point where the clamp 46 on the carriage 22 would previously have been engaged.

The band saw strip manipulator and welding section described above can be used advantageously with a wide variety of lengths of strip for welding because the central section of the strip is supported above the manipulator allowing quite considerable lengths to be accommodated by the manipulator. This is in contrast to prior art devices which have accommodated the central section of the strip beneath the manipulating section thus requiring a large distance between the ground and the manipulating section to accommodate a reasonable length of strip without interference with the ground beneath.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A manipulator for presenting a strip for welding to a welding machine comprising strip adjustment means and end clamp means for clamping end sections of the strip, which adjustment means are operable to adjust the position of end sections of the strip in the end clamp means, and which end clamp means are operable to first clamp the end sections of the strip when the strip is a substantially elongate configuration, in which the end sections point substantially away from each other, and then to pivot to manipulate the strip from the substantially elongate configuration to a loop configuration, in which the end sections point towards each other, for welding, in which the end clamp means are operable to pivot between the elongate and loop configurations and in which the strip is an unwelded band saw blade.

2. A manipulator as claimed in claim 1, in which the strip adjustment means are mounted for movement transverse to the length of the strip.

3. A manipulator as claimed in claim 1, in which the strip adjustment means are operable to move between a first position in which at least one end section of the strip is spaced from the end clamp means and a second position in which said at least one end section of the strip is substantially adjacent to the end clamp means.

4. A manipulator as claimed in claim 3 in which the strip adjustment means are mounted for substantially vertical movement.

5. A manipulator as claimed in claim 3, in which the strip adjustment means, in use, cause a loop of the strip to be pulled upwardly when moving to said second position.

6. A manipulator as claimed in claim 1, in which the strip adjustment means are operable to pull the strip through the end clamp means.

7. A manipulator as claimed in claim 6 in which the pulling is effected until at least one end detector detects an end of the strip.

8. A manipulator as claimed in claim 7, which includes one end detector for each end of the strip.

9. A manipulator as claimed in claim 6, in which the strip adjustment means include a clamp, which is arranged to hold the strip in position during said pulling.

10. A manipulator as claimed in claim 1, in which the end clamp means comprise two or more clamp sections.

11. A manipulator as claimed in claim 10, in which one clamp section is located to one side of the strip adjustment means and the second to the opposite side of the strip adjustment means.

12. A manipulator as claimed in claim 1, in which the end clamp means are operable to move between a strip receiving configuration and a loop delivery configuration.

13. A manipulator as claimed in claim 12, in which the strip receiving configuration comprises at least one opening of the end clamp means being aligned along a longitudinal axis of the strip, when the strip is in the elongate configuration.

14. A manipulator as claimed in claim 12, in which the loop delivery configuration comprises at least one opening of the end clamp means being aligned along a longitudinal axis of the end sections of the strip when the strip is in the loop configuration.

15. A manipulator as claimed in claim 12, in which the longitudinal axis of the end sections when in the elongate configuration is at a different level than the longitudinal axis of the strip when in the elongate configuration.

16. A manipulator as claimed in claim 12, in which the end clamp means are mounted to pivot between said strip receiving and said loop delivery configurations.

17. A manipulator as claimed in claim 12, in which the end clamp means comprise at least one clamp mounted on an arm.

18. A manipulator as claimed in claim 12, in which the arm comprises two sections formed at an angle to each other, which angle permits said at least one clamp to move between different levels when the arm is pivoted.

19. A manipulator as claimed in claim 18, in which the different levels are those of the strip end sections when in the strip receiving configuration and in the loop delivery configuration.

20. A manipulator as claimed in claim 1, which is movable between a strip receiving position and a transfer position for transferring a strip for welding to a welder.

21. A method of manipulating a strip for presentation to a welding machine comprising receiving a strip in a manipulator in a substantially elongate configuration in end clap means, adjusting the position of at least one end section of the strip in the end clamp means with strip adjustment means, clamping the end sections of the strip in the end clamp means when the strip is in the substantially elongate configuration, in which the end sections point substantially away from each other, and pivoting the clamped end clamp means to manipulate the strip from the substantially elongate configuration to a loop configuration, in which the end sections point towards each other, for welding, in which the end clamp means are operable to pivot between the elongate and loop configurations and in which the strip is an unwelded band saw blade.

22. A method of manipulating a strip as claimed in claim 21, in which the strip is clamped by a first clamp of the end clamp means when it reaches a chosen position relative to the first clamp.

23. A method of manipulating a strip as claimed in claim 21, in which the adjustment of the said at least one end section is an adjustment in a second clamp of the clamp means.

24. A method of manipulating a strip as claimed in claim 21, in which the strip adjustment means adjusts the position of the strip by pulling a section of the strip through the end clamp means.

25. A manipulator as claimed in claim 1, in which each of the end clamp means pivots about a respective pivot point, and in which each pivot point is fixed.

26. A manipulator as claimed in claim 1, in which each of the end clamp means is actively driven.

27. A method of manipulating a strip as claimed in claim 21, in which pivoting the clamped end clamp me includes pivoting the clamped end clamp means about respective fixed pivot points to manipulate the strip from the substantially elongate configuration to the loop configuration.

28. A method of manipulating a strip as claimed in claim 21, which pivoting the clamped end clamp means includes actively driving each of the clamped end clamp means to manipulate the strip from the substantially elongate configuration to the loop configuration.

* * * * *